(12) United States Patent
Yamamoto et al.

(10) Patent No.: US 12,370,978 B2
(45) Date of Patent: Jul. 29, 2025

(54) ELECTRONIC KEY SYSTEM

(71) Applicant: DENSO CORPORATION, Kariya (JP)

(72) Inventors: Hiroya Yamamoto, Kariya (JP); Ryusuke Ishikawa, Kariya (JP); Kohei Nimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 18/357,841

(22) Filed: Jul. 24, 2023

(65) Prior Publication Data

US 2023/0365102 A1 Nov. 16, 2023

Related U.S. Application Data

(63) Continuation of application No. PCT/JP2021/045332, filed on Dec. 9, 2021.

(30) Foreign Application Priority Data

Jan. 28, 2021 (JP) ................. 2021-011594

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *B60R 2325/101* (2013.01); *G07C 2009/00793* (2013.01); *G07C 2009/00984* (2013.01); *G07C 2209/08* (2013.01)

(58) Field of Classification Search
CPC ............. B60R 25/24; B60R 2325/101; G07C 9/00309; G07C 2009/00793; G07C 2009/00984; G07C 2209/08; G07C 2009/0038; G07C 2009/00555; E05B 49/00; H04Q 9/00

See application file for complete search history.

(56) References Cited

U.S. PATENT DOCUMENTS

| 2010/0231354 A1* | 9/2010 | Nishiguchi ............. H04L 63/08 340/5.8 |
| 2021/0246693 A1* | 8/2021 | Elangovan ............... G06F 21/44 |
| 2022/0198850 A1* | 6/2022 | Buyuksahin .......... G06F 1/3287 |

FOREIGN PATENT DOCUMENTS

| JP | H05184002 A | 7/1993 |
| JP | 2009078745 A | 4/2009 |
| JP | 2009270492 A | 11/2009 |

(Continued)

*Primary Examiner* — Brian Wilson
(74) *Attorney, Agent, or Firm* — Harness, Dickey & Pierce, P.L.C.

(57) ABSTRACT

An electronic key system installed in a vehicle includes: a first wireless communication controller performing transmission of a predetermined radio signal, as a verification signal, via a first wireless communication to confirm presence or absence of each of a first portable device and a second portable device each of which is usable as an electronic key of the vehicle; a second wireless communication controller periodically performing transmission/reception of the radio signal via second wireless communication to and from each of the first portable device and the second portable device upon transmitting/receiving the verification signal; and an integrity controller integrally controlling an operation of each of the first wireless communication controller and the second wireless communication controller.

8 Claims, 8 Drawing Sheets

(56) References Cited

FOREIGN PATENT DOCUMENTS

| | | |
|---|---|---|
| JP | 2019190044 A | 10/2019 |
| JP | 2020006752 A | 1/2020 |
| JP | 2020033707 A | 3/2020 |

\* cited by examiner

ELECTRONIC KEY SYSTEM

CROSS REFERENCE TO RELATED APPLICATION

This application is a continuation application of International Patent Application No. PCT/JP2021/045332 filed on Dec. 9, 2021, which designated the U.S. and claims the benefit of priority of Japanese Patent Application No. 2021-011594, filed on Jan. 28, 2021, the disclosure of which is incorporated herein by reference.

TECHNICAL FIELD

The present disclosure relates to an electronic key system installed in a vehicle.

BACKGROUND

In recent years, devices called key fobs and portable devices such as smartphones have been used as electronic keys for vehicles. Also, an electronic key system has been put into practical use for unlocking a door of a vehicle, starting the vehicle, etc., when verification by wirelessly exchanging information such as an ID between an in-vehicle device installed in the vehicle and the portable device is successful.

In both of periodic verification and event verification, transmission and reception of information such as an ID is periodically performed between the portable device and the in-vehicle device, and there may be a possibility of overlapping between (a) a transmission/reception timing of a radio signal for periodic verification and (b) a transmission/reception timing of a radio signal for event verification.

SUMMARY

In one aspect of the present disclosure, an electronic key system installed in a vehicle includes: a first wireless communication controller performing transmission of a predetermined radio signal, as a verification signal, via a first wireless communication to confirm presence or absence of each of a first portable device and a second portable device each of which is usable as an electronic key of the vehicle; a second wireless communication controller periodically performing transmission/reception of the radio signal via second wireless communication to and from each of the first portable device and the second portable device upon transmitting/receiving the verification signal; and an integrity controller integrally controlling an operation of each of the first wireless communication controller and the second wireless communication controller. When the first wireless communication controller attempts to transmit the verification signal to confirm presence or absence of the second portable device while the second wireless communication controller is periodically performing, as a first transmission/reception, transmission/reception of the radio signal with the first portable device via the second wireless communication in response to the first portable device receiving the verification signal. The integrity controller adjusts a transmission timing of the verification signal for confirming presence or absence of the second portable device to avoid overlapping between (i) a timing of a second transmission/reception that is periodic transmission/reception of the radio signal performed by the second wireless communication controller with the second portable device via the second wireless communication in response to the second portable device receiving the verification signal and (ii) a timing of the first transmission/reception that is being performed.

BRIEF DESCRIPTION OF THE DRAWINGS

Objects, features and advantages of the present disclosure will become more apparent from the following detailed description made with reference to the accompanying drawings. In the drawings.

DETAILED DESCRIPTION

To begin with, a relevant technology will be described only for understanding the following embodiments. In an electronic key system, a predetermined signal (hereinafter referred to as a "verification signal") according to an instruction from the in-vehicle device, for example, a wake signal for returning the portable device from a sleep operation mode to a normal operation mode, is transmitted from a vehicle-mounted antenna, and information such as an ID is transmitted from the portable device that has received the signal. Then, the in-vehicle device that has received the information such as the ID executes verification of the portable device. As a verification of the portable device, there has been (a) a procedure as shown in relevant art, in which a verification signal is periodically transmitted without requiring an external trigger and verification is performed by such a trigger of the transmission and reception of the verification signal (hereinafter referred to as "periodic verification"), and (b) a procedure as shown in other relevant art, in which a verification signal is transmitted by a trigger of an event such as a user touching a door of a vehicle, and transmission and reception of the verification signal is used as a trigger for performing a verification (hereinafter referred to as "event verification"). In both of periodic verification and event verification, transmission and reception of information such as an ID is periodically performed between the portable device and the in-vehicle device.

The electronic key system may employ a configuration in which both of the periodic verification and the event verification are performed. For example, when a person who owns a portable device is sitting in the driver's seat, periodic verification is performable with the portable device, and, when another person who owns another portable device touches a door handle for unlocking a passenger side door, event verification is performable by such a trigger. In such a configuration, there may be a possibility of overlapping between (a) a transmission/reception timing of a radio signal for periodic verification and (b) a transmission/reception timing of a radio signal for event verification. When such an overlapping occurs, the radio signals for both verifications interfere with each other, a sequence for establishing a radio connection for verification cannot be complete, retries are repeated, and it takes a long time to complete event verification, causing a problem of responsiveness deterioration.

Such a problem may be experienced not only in a configuration in which periodic verification and event verification are performable in a time-overlapping manner, but also in a configuration in which verifications of any kind are performable in a time-overlapping manner. For example, such a problem may occur even when two portable devices and a vehicle respectively perform periodic verification at an overlapping timing. Therefore, in a configuration in which wireless communication for verification is performed between two portable devices and a vehicle, there has been a need for a technology capable of suppressing an increase in required time for verification.

As one form of the present disclosure, an electronic key system installed in a vehicle includes: a first wireless communication controller performing transmission of a predetermined radio signal, as a verification signal, via a first wireless communication to confirm presence or absence of each of a first portable device and a second portable device each of which is usable as an electronic key of the vehicle; a second wireless communication controller periodically performing transmission/reception of the radio signal via second wireless communication to and from each of the first portable device and the second portable device upon transmitting/receiving the verification signal; and an integrity controller integrally controlling an operation of each of the first wireless communication controller and the second wireless communication controller. When the first wireless communication controller attempts to transmit the verification signal to confirm presence or absence of the second portable device while the second wireless communication controller is periodically performing, as a first transmission/reception, transmission/reception of the radio signal with the first portable device via the second wireless communication in response to the first portable device receiving the verification signal. The integrity controller adjusts a transmission timing of the verification signal for confirming presence or absence of the second portable device to avoid overlapping between (i) a timing of a second transmission/reception that is periodic transmission/reception of the radio signal performed by the second wireless communication controller with the second portable device via the second wireless communication in response to the second portable device receiving the verification signal and (ii) a timing of the first transmission/reception that is being performed.

According to the electronic key system in the above-described aspect, in case of performing a transmission attempt to transmit the verification signal for confirming presence or absence of the second portable device when the first transmission/reception is being performed, the integrity controller adjusts a transmission timing of the verification signal for confirming presence or absence of the second portable device in order to avoid an overlap of (a) a timing of the second transmission/reception and (b) a timing of the first transmission/reception, an interference between (a) the radio signal of the second wireless communication with the first portable device and (b) the radio signal of the second wireless communication with the second portable device is suppressible.

Therefore, in a configuration in which wireless communication for verification is performed between two portable devices and a vehicle (i.e., an electronic key system), it is possible to suppress an increase of length of time required for verification.

A. First Embodiment

Figure 1:
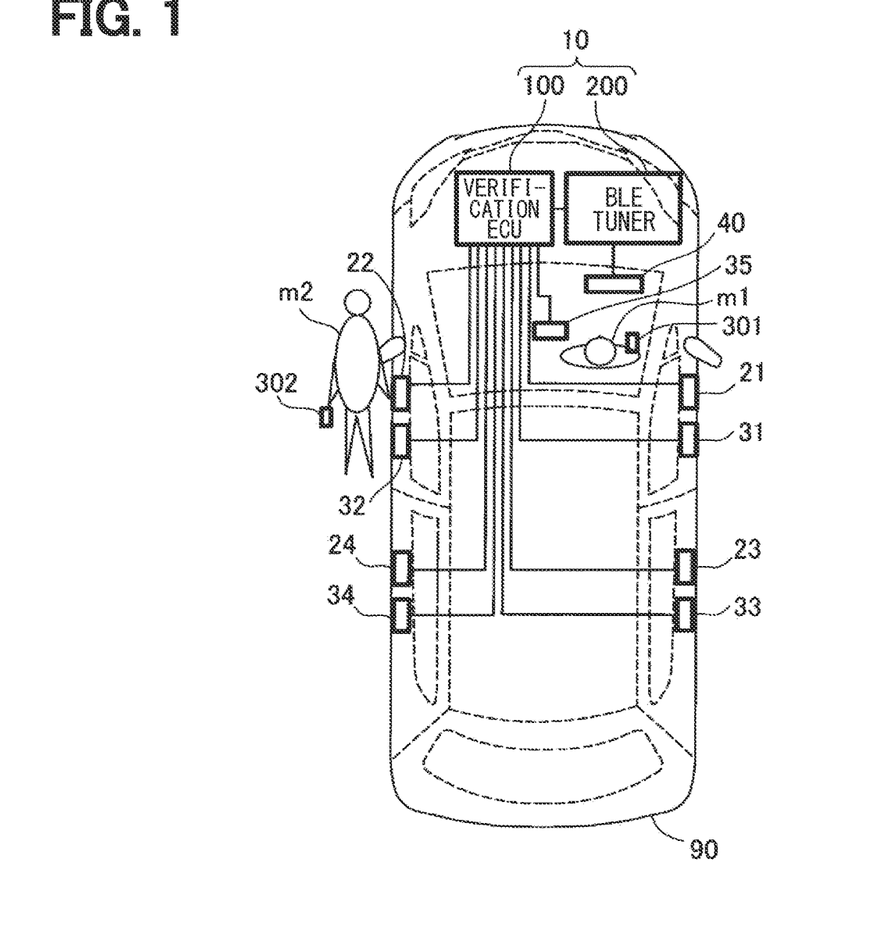
FIG. 1 is an explanatory diagram showing a schematic configuration of an electronic key system as an embodiment of the present disclosure.

A1. System Configuration:

An electronic key system 10 shown in FIG. 1 is installed in a vehicle 90, and performs wireless communication with two portable devices (i.e., a first portable device 301 and a second portable device 302) to exchange authentication information. Further, the electronic key system 10 causes the vehicle 90 to perform a predetermined operation, when, on condition that authentication (verification) is successful, (a) the two portable devices 301 and 302 are within a predetermined distance range from the vehicle 90 or (b) a user m1 or m2 performs a predetermined operation such as touching a door handle or operating a predetermined switch of the vehicle 90. Examples of the predetermined operation include locking and unlocking doors of the vehicle 90, starting the vehicle 90, turning on a light of the vehicle 90 (i.e., a welcome light), and the like. In other words, the electronic key system 10 corresponds to a so-called PEPS (Passive Entry/Passive Start) system.

The first portable device 301 and the second portable device 302 shown in FIG. 1 have the same configuration with each other. Therefore, in the present embodiment, the first portable device 301 and the second portable device 302 may collectively be referred to as "portable device 300" when distinction therebetween is not recognized. The portable device 300 is used as an electronic key for the vehicle 90.

Figure 2:
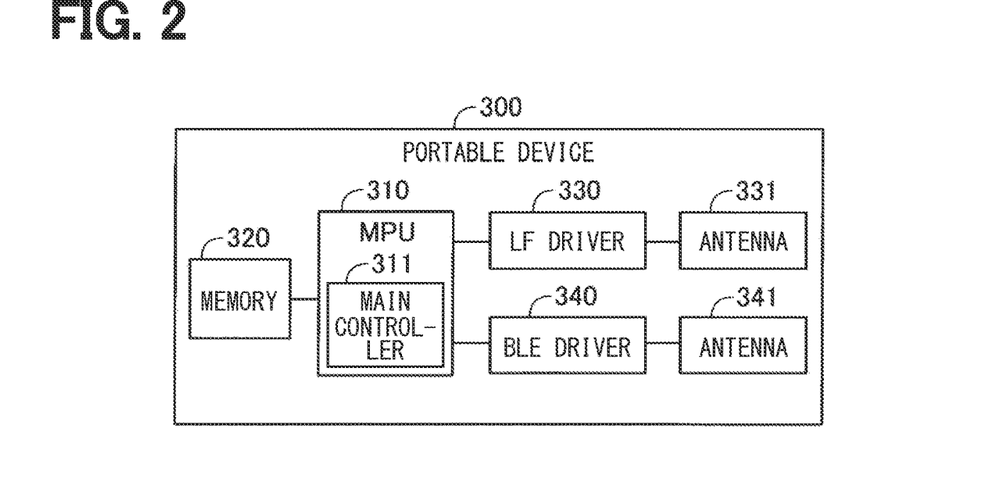
FIG. 2 is a block diagram showing a configuration of a portable device according to a first embodiment.

The portable device 300 shown in FIG. 2 may also be referred to as a so-called "key fob" in the present embodiment, and is configured as a dedicated device as an electronic key for the vehicle 90. The portable device 300 can independently perform wireless communication with the electronic key system 10 using two types of communication methods. In the present embodiment, "wireless communication of two types of communication methods" means LF wireless communication and BLE (Bluetooth Low Energy ("Bluetooth" is a registered trademark)) communication. LF wireless communication means wireless communication using radio frequencies in the LF (Low Frequency) band of, for example, 30 kHz to 300 kHz.

The portable device 300 includes a memory 320, an MPU (Micro Processing Unit) 310, an LF driver 330, an antenna 331 for LF wireless communication, a BLE driver 340, and an antenna 341 for BLE wireless communication. The MPU 310 functions as a main controller 311 by executing a control program pre-stored in the memory 320. The main controller 311 controls LF wireless communication and BLE wireless communication by controlling the LF driver 330 and the BLE driver 340, and exchanges information with the electronic key system 10 via these wireless communications.

The LF driver 330 realizes LF wireless communication. In the present embodiment, for LF wireless communication, the portable device 300 only receives an LF wireless communication signal (hereinafter also referred to simply as an "LF signal") transmitted from the electronic key system 10, and does not transmit any LF signal. The LF signal corresponds to a Wake signal or the like that triggers a return to a normal operation mode when the portable device 300 is operating in a sleep operation mode. The LF driver 330 is configured by, for example, an IC (Integrated Circuit). The antenna 331 receives the LF signal.

The BLE driver 340 realizes BLE wireless communication. The BLE driver 340 operates as a so-called "peripheral" defined for BLE, and is configured by an IC, for example. For BLE wireless communication, the BLE driver 340 transmits an "Advertise" signal and receives a "Connect" signal. The antenna 341 transmits and receives radio signals in BLE wireless communication (hereinafter also referred to as "BLE signals").

The portable device 300 having the above configuration, that is, the first portable device 301 and the second portable device 302, can be possessed by different users. In the example of FIG. 1, the first portable device 301 is possessed by the user m1, and the second portable device 302 is possessed by the user m2. In the example of FIG. 1, the user m1 is sitting in the driver's seat, and the user m2 is about to open the door on a front passenger side to sit in a front passenger seat.

As shown in FIG. 1, in addition to the electronic key system 10, the vehicle 90 has four sensors 21, 22, 23, 24, five LF antennas 31, 32, 33, 34, 35 and one BLE antenna 40 respectively installed therein. The four sensors 21 to 24 are respectively arranged on the door handle, and detect a contact (i.e., a touch) on the handle by the user. The four LF antennas 31 to 34 are respectively located inside each door, and transmit LF signals. Also, the LF antenna 35 is arranged at a position between the driver's seat and the passenger's seat, and transmits the LF signal. The BLE antenna 40 is arranged inside the vehicle 90. The BLE antenna 40 transmits and receives the BLE signals. In FIG. 1, the BLE antenna 40 is illustrated as being arranged near the driver's seat, but in reality it is arranged, for example, inside a pillar on the driver's seat side. In the present embodiment, a range in which the LF signals output from the LF antennas 31 to 35 can be received with a predetermined received signal strength or more is a spherical range with a radius of approximately several tens of centimeters.

Figure 3:
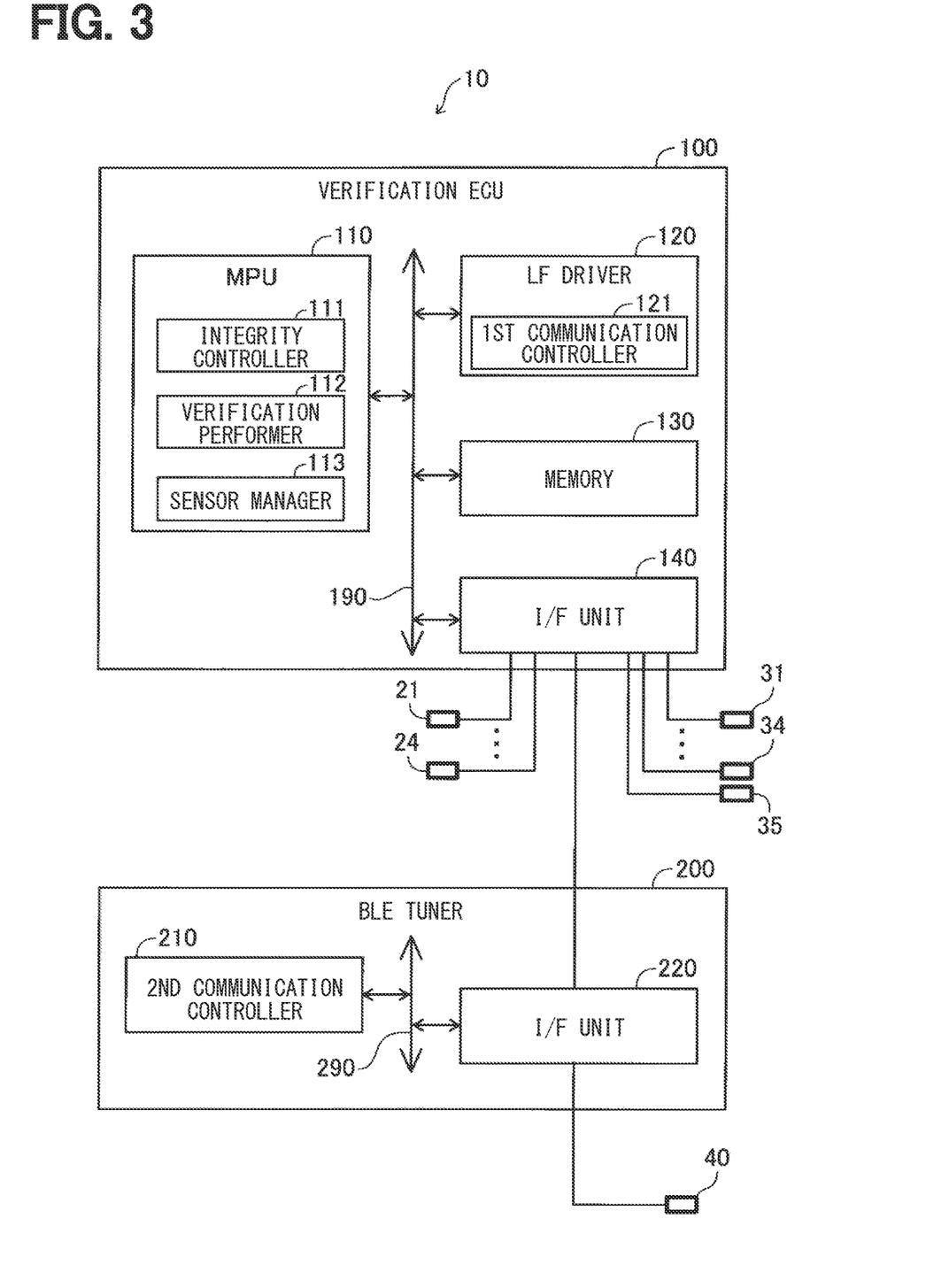
FIG. 3 is a block diagram showing a detailed configuration of a verification ECU and a BLE tuner.

As shown in FIGS. 1 and 3, the electronic key system 10 includes a verification ECU (Electronic Control Unit) 100 and a BLE tuner 200.

The verification ECU 100 performs authentication (verification) of the portable device 300, LF wireless communication, and management of the four sensors 21 to 24. The verification ECU 100 is configured to communicate with the BLE tuner 200. Similarly, the verification ECU 100 is electrically connected to the four sensors 21 to 24, and receives touch detection results of the sensors 21 to 24. The verification ECU 100 is electrically connected to the five LF antennas 31 to 35.

As shown in FIG. 3, the verification ECU 100 is composed of a microcomputer, and includes an MPU 110, an LF driver 120, a memory 130 and an interface unit (I/F unit) 140. The MPU 110, the LF driver 120, the memory 130 and the I/F unit 140 are all configured to communicate with each other via an internal bus 190. The MPU 110 functions as an integrity controller 111, a verification performer 112, and a sensor manager 113 by executing control programs stored in the memory 130.

The integrity controller 111 performs integrated control of operations of a first communication controller 121 and a second communication controller 210, which are described later. Details of the processing of the integrity controller 111 are described later. The verification performer 112 performs authentication (verification) based on the authentication information received from the portable device 300. The sensor manager 113 receives the touch detection results transmitted from the four sensors 21 to 24, and identifies which door is touched.

The LF driver 120 performs LF wireless communication. The LF driver 120 includes the first communication controller 121. The first communication controller 121 transmits a predetermined verification signal by LF wireless communication in order to confirm the presence or absence of each of the first portable device 301 and the second portable device 302. In the present embodiment, the "predetermined verification signal" described above corresponds to a wake signal in LF wireless communication. Using a reception of the wake signal as a trigger, the portable device 300 shifts to the normal operation mode, and starts BLE wireless communication. Specifically, the portable device 300 transmits an advertise signal. By receiving the advertise signal, the first communication controller 121 can confirm that the portable device 300 exists within a reachable area of the LF signal. On the other hand, if the advertise signal is not received within a predetermined period after transmitting the wake signal, it can be confirmed that the portable device 300 does not exist.

In the present embodiment, the memory 130 is configured by an EEPROM (Electrically Erasable Programmable Read-Only Memory), and pre-stores the control program described above. The I/F unit 140 includes an interface group for electrical connection to the four sensors 21 to 24, the five LF antennas 31 to 35, and the BLE tuner 200.

The BLE tuner 200 functions as a so-called "central" defined in BLE, and performs BLE wireless communication with each of the first portable device 301 and the second portable device 302. In BLE wireless communication, a predetermined communication sequence is performed in which signal transmission and reception are performed periodically. Specifically, an advertise signal is transmitted from the peripheral and the advertise signal is received by the central, and after a predetermined time, a connect signal is transmitted from the central and the connect signal is received by the peripheral. In such manner, after the BLE connection between the peripheral and the central is established and after a predetermined time from the reception of the connect signal, the authentication information is transmitted/received as a BLE signal.

The BLE tuner 200 includes the second communication controller 210 and an interface unit (I/F unit) 220. The second communication controller 210 and the I/F unit 220 are configured to be communicable with each other via an internal bus 290. The second communication controller 210 performs BLE wireless communication with each of the first portable device 301 and the second portable device 302. Specifically, the above-described periodic exchange of BLE signals is performed with each of the first portable device 301 and the second portable device 302.

As described above, in the electronic key system 10, BLE wireless communication between the portable device 300 and the electronic key system 10, that is, periodic exchange of BLE signals, is triggered by a reception of the wake signal that is the LF signal. In the present embodiment, there are two types of triggers for transmitting the wake signal from the electronic key system 10. Specifically, a first transmission trigger is "an arrival of a periodic verification timing during a periodic verification for confirmation (hereinafter "periodic verification") of the presence or absence of the portable device 300 by periodically transmitting a wake signal." Such a periodic verification is, when verification of one of the first portable device 301 and the second portable device 302 is performed once, performed for confirmation of the presence or absence of the target portable device 300 (whether the portable device 300 once confirmed as existing in the vehicle 90 continues to be existing in the vehicle 90 or not.) A second transmission trigger is "an event verification performed by transmitting a wake signal to confirm the presence or absence of the portable device 300, which is triggered by a start of a predetermined event." In the present embodiment, the "predetermined event" corresponds to "the user m1 or m2 touching the handle of one of the doors." As described above, the transmission of the wake signal in the periodic verification is performed periodically, while the transmission of the wake signal in the event verification is performed asynchronously with the transmission of the wake signal in the periodic verification. However, in the electronic key system 10 of the present embodiment, by performing an event verification process described later, transmission/reception timing of the radio signal is controlled not to overlap with each other in the following (A) and (B), that is, (A) periodic transmission/reception of the BLE signal (hereinafter referred to as a "first transmission/reception") triggered by transmission/reception of the wake signal for the periodic verification, and (B) periodic transmission/reception of the BLE signal (hereinafter referred to as a "second transmission/reception") triggered by transmission/reception of the wake signal for the event verification.

Figure 4:
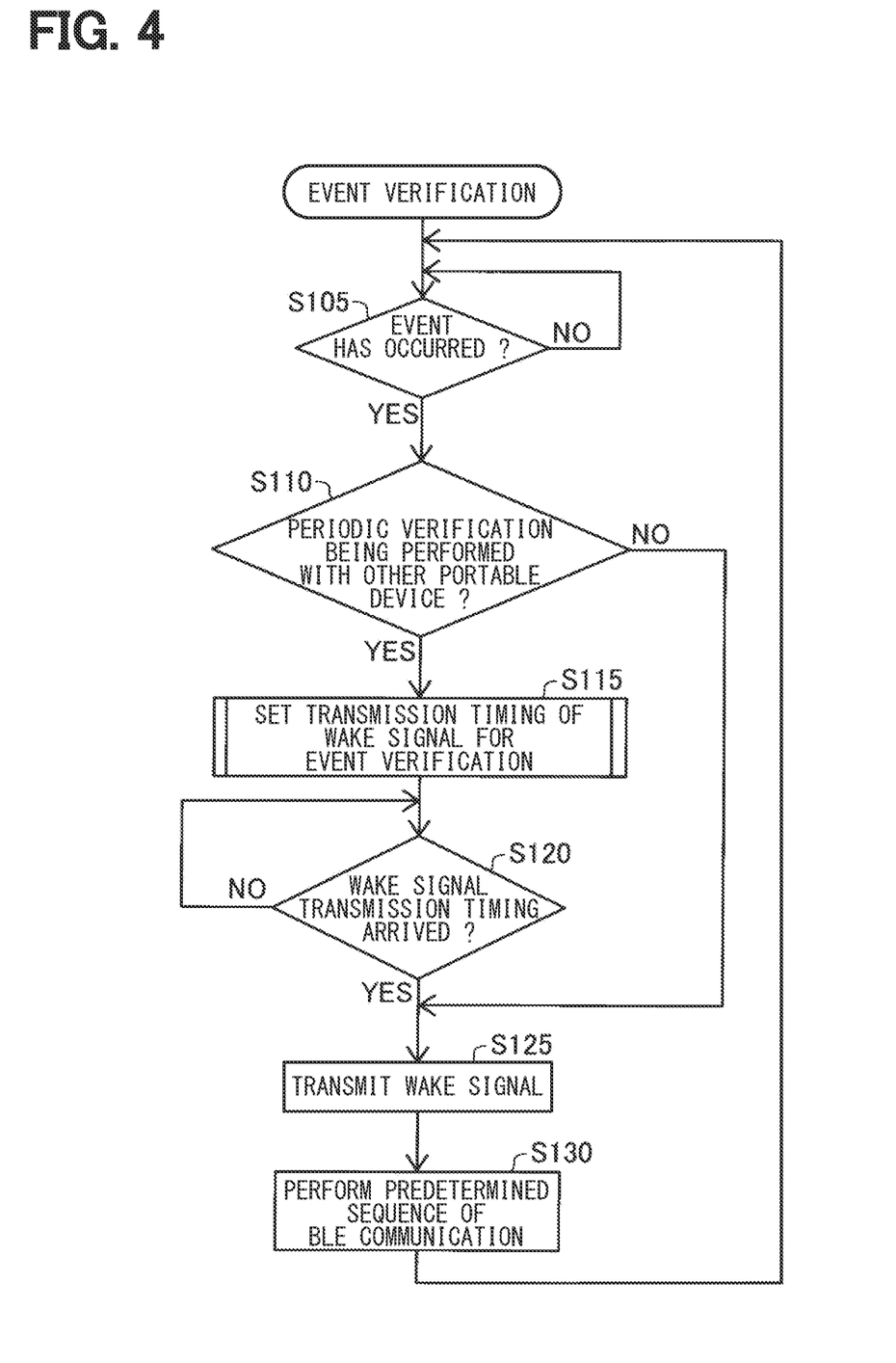
FIG. 4 is a flowchart showing a procedure of an event verification process performed in the electronic key system in the first embodiment.

A2. Event Verification Process:

When the verification ECU 100 is powered on, the event verification process shown in FIG. 4 is performed. The sensor manager 113 of the verification ECU 100 determines whether or not a predetermined event, that is, a touch to the handle of any door has occurred (step S105). If it is determined that a predetermined event has not occurred (step S105: NO), step S105 is performed again.

If it is determined that a predetermined event has occurred (step S105: YES), the integrity controller 111 determines whether the verification performer 112 is already performing a periodic verification with other portable device(s) (step S110). In step S110, "performing a periodic verification" means not only a state that the LF signal and the BLE signal are actually and currently being exchanged, but also a state that, although the LF signal and the BLE signal are not currently being exchanged, a wake signal is scheduled to be transmitted in order to confirm the presence or absence of the portable device 300 when a scheduled time arrives.

When it is determined that the periodic verification is not being performed (step S110: NO), the first communication controller 121 of the verification ECU 100 transmits a wake signal (step S125). The second communication controller 210 performs a predetermined sequence of BLE wireless communication, that is, reception of an advertise signal, transmission of a connect signal, transmission/reception of authentication information, and the like (step S130). The above steps S125 and S130 mean performing an event verification. After completion of step S130, the process returns to step S105. Note that the exchange of the BLE signal by the second portable device 302 in step S130 corresponds to a "second transmission/reception."

In step S110 described above, when it is determined that a periodic verification is being performed (step S110: YES), the integrity controller 111 sets a transmission timing of the wake signal for an event verification (step S115).

Figure 5:
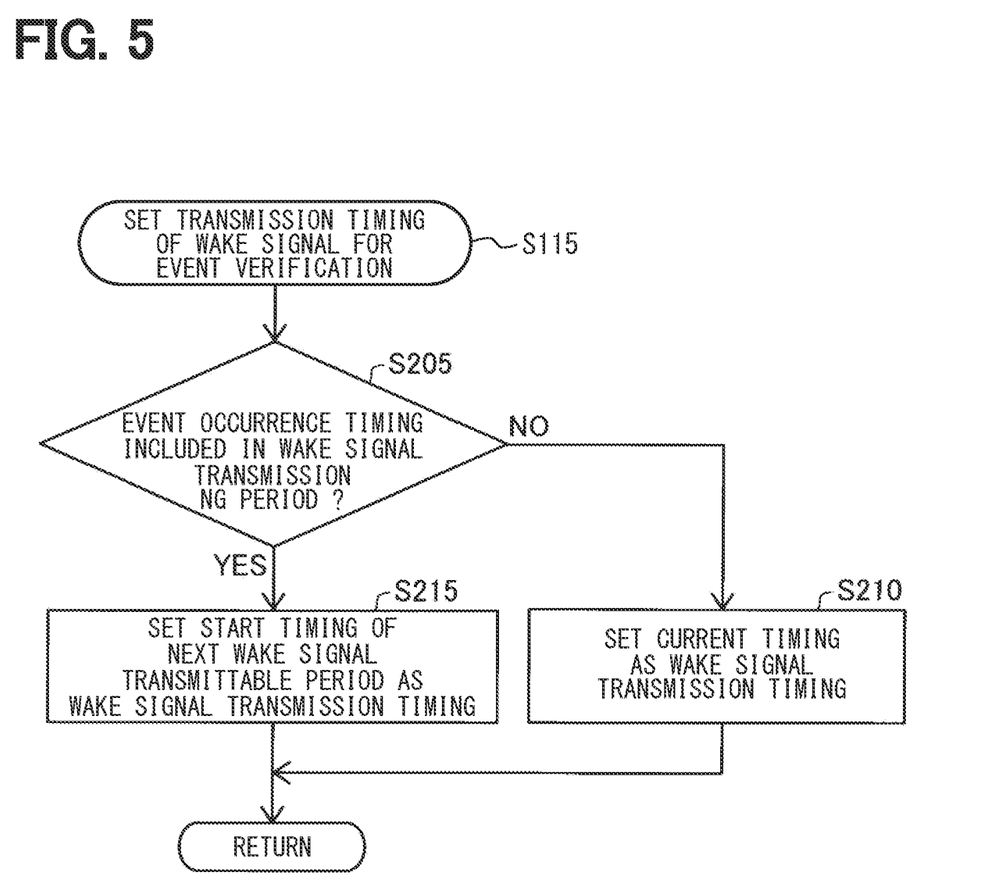
FIG. 5 is a flowchart showing a detailed procedure of an event timing determination step.

As shown in FIG. 5, in step S115, the integrity controller 111 first determines whether or not an occurrence of the event timing is included in a wake signal transmission NG period (step S205). When it is determined that the occurrence of the event timing is not included in the wake signal transmission NG period (step S205: NO), the current timing is set as a wake signal transmission timing (step S210). On the other hand, when it is determined that the occurrence of the event timing is included in the wake signal transmission NG period (step S205: YES), integrity controller 111 sets a start timing of the next wake signal transmittable period as the wake signal transmission timing. (step S215). When step S210 or S215 is complete, the process proceeds to step S120 shown in FIG. 4. The specific processing of step S115 including the above-described "wake signal transmission NG period" and "wake signal transmittable period" are described using FIG. 6.

Figure 6:
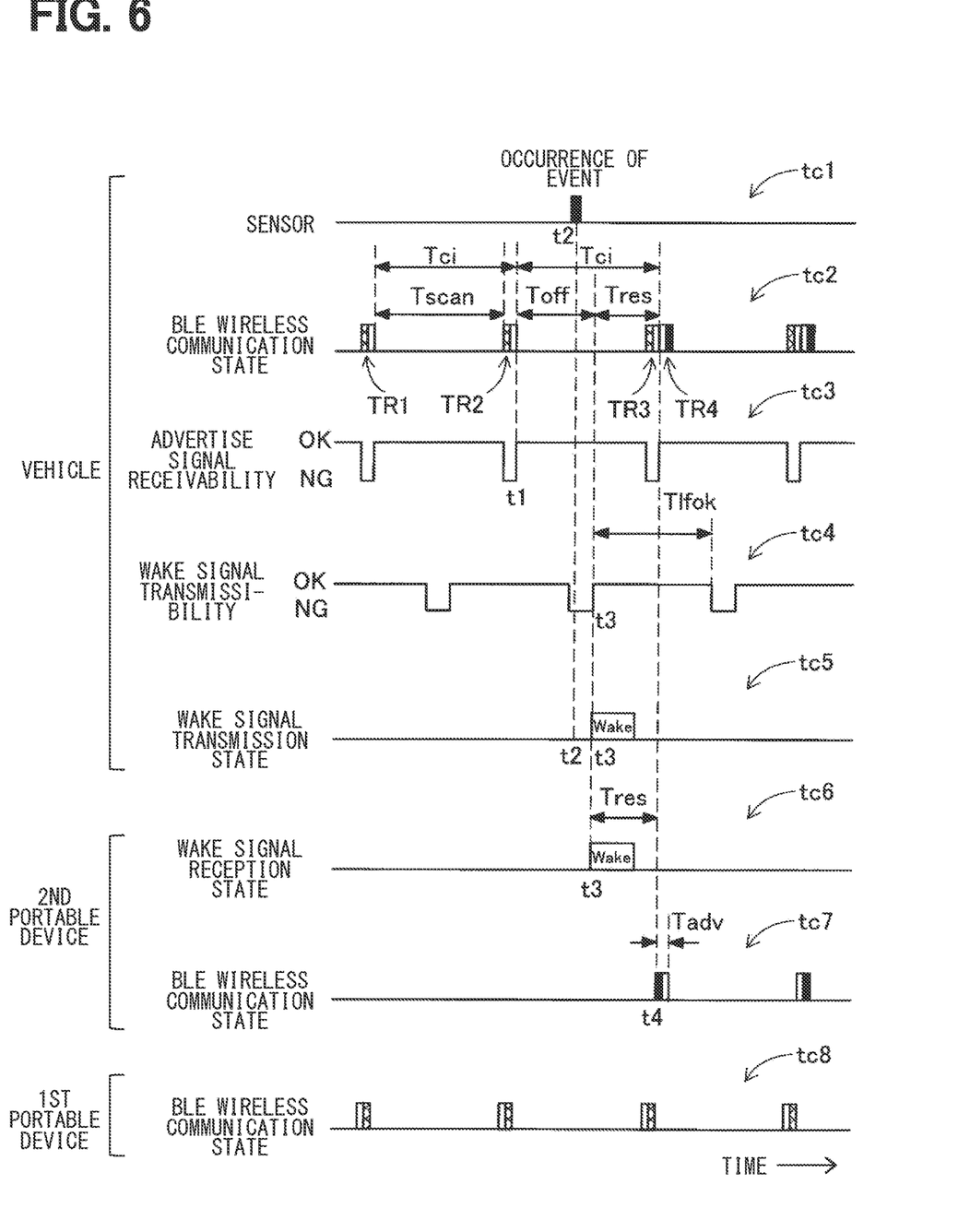
FIG. 6 is a timing chart showing an example of changes over time in signals and states related to wireless communication in a vehicle, a first portable device, and a second portable device.

In FIG. 6, it is shown as a diagram of various signal changes in a situation, in which, as shown in FIG. 1, the user m1 is already sitting in the driver's seat, and the periodic verification is being performed to confirm the existence of the first portable device 301 possessed by the user m1, when the user m2 touches the sensor 22 on the passenger side door.

In FIG. 6, a first timing chart tc1 to a fifth timing chart tc5 are respectively a timing chart for the vehicle 90 (i.e., the electronic key system 10), and a sixth timing chart tc6 and a seventh timing chart tc7 are a timing chart for the second portable device 302, and an eighth timing chart tc8 is a timing chart for the first portable device 301.

The first timing chart tc1 in a top row indicates whether or not an event in the sensor 22, that is, a touch by the user m2 is detected. The second timing chart tc2 in a second row indicates a BLE wireless communication state in the BLE tuner 200 of the vehicle 90. In the second timing chart tc2, hatched or black-filled rectangles represent BLE signal transmission, and white rectangles represent BLE signal reception.

The third timing chart tc3 in a third row shows a state of an internal flag (i.e., an advertise signal receivability flag) indicating an advertise signal receivable state. In the present embodiment, the advertise signal receivability flag indicates that an advertise signal can be received (OK) when it is "1" (High), and indicates that an advertise signal cannot be received (NG) when it is "0" (Lo). The advertise signal receivability flag is set by the integrity controller 111. The second communication controller 210 determines whether or not the advertise signal can be received according to the setting of the advertise signal receivability flag.

The fourth timing chart tc4 in a fourth row shows a state of an internal flag (i.e., a wake signal transmissibility flag) indicating a wake signal transmissible state. In the present embodiment, the wake signal transmissibility flag indicates that a wake signal can be transmitted (OK) when it is "1" (High), and indicates that a wake signal cannot be transmitted (NG) when it is "0" (Lo). The wake signal transmissibility flag is set by the integrity controller 111. The first communication controller 121 determines whether a wake signal can be transmitted according to the setting of the wake signal transmissibility flag. The fifth timing chart tc5 in a fifth row shows a state of wake signal transmission by the first communication controller 121.

The sixth timing chart tc6 in a sixth row shows a reception state of the wake signal by the LF driver 330 in the second portable device 302. The seventh timing chart tc7 in a seventh row shows a BLE wireless communication state by the BLE driver 340 in the second portable device 302. In the seventh timing chart tc7, black filled rectangles represent BLE signal transmission, and white rectangles represent BLE signal reception.

The eighth timing chart tc8 in the bottom row shows a BLE wireless communication state by the BLE driver 340 in the first portable device 301. In the eighth timing chart tc7, hatched rectangles represent BLE signal transmission, and white rectangles represent BLE signal reception.

As shown in the second timing chart tc2, transmission/reception of the BLE signal (hereinafter referred to as "first transmission/reception") associated with the periodic verification of the first portable device 301 is being performed. Specifically, a plurality of first transmission/receptions TR1, TR2, TR3, . . . are performed periodically. That is, a transmission cycle Tci of the first transmission/reception is constant. In a period from the reception of the BLE signal in one first transmission/reception to the transmission of the BLE signal in the next first transmission/reception, that is, for example, during a time Tscan from the reception in the first transmission/reception TR1 to the transmission in the first transmission/reception TR2, the second communication controller 210 is not performing BLE wireless communication, and the second communication controller 210 can perform BLE wireless communication during such time. Therefore, as shown in the third timing chart tc3, the integrity controller 111 sets the advertise signal receivability flag to "OK" during a time corresponding to the time Tscan. On the other hand, the second communication controller 210 cannot perform other BLE wireless communications while the first transmission/receptions TR1, TR2, TR3, . . . are being performed. More specifically, even when the BLE signal is transmitted from the portable device 300 during such time, it interferes with the radio signal in the first transmission/reception performed by the other portable device 300, and no radio signal can be normally receivable, leading to repeated retries. Therefore, as shown in the third timing chart tc3, the integrity controller 111 sets the advertise signal receivability flag to "NG" while the first transmission/reception is being performed.

The setting of the wake signal transmissibility flag as shown in the fourth timing chart tc4 is described. The integrity controller 111 sets the wake signal transmissibility flag to "OK" after an offset time Toff or longer from the timing when the advertise signal receivability flag becomes "OK." The offset time Toff is a time obtained by subtracting a time Tres from the transmission cycle Tel described above, as shown in FIG. 6. The time Tres is a time from a reception of the wake signal to a start of transmission of the BLE signal (i.e., an advertise signal) by the BLE driver 340 in the portable device 300. The time Tres also includes a transition time during which the portable device 300 that has received the wake signal transitions from the sleep operation mode to the normal operation mode. Then, the wake signal transmissibility flag is set to "OK" at a timing after the end timing of the previous first transmission/reception by the offset time Toff obtained by subtracting the time Tres from the transmission cycle Tci. In the example of FIG. 6, for example, since the first transmission/reception TR2 has ended at time t1, the wake signal transmissibility flag is set to "OK" at time t3 after the offset time Toff from time t1.

In the example of FIG. 6, as shown in the first timing chart tc1, the sensor 22 detects a touch at time t2 between time t1 and time t3. However, at such timing, the wake signal transmissibility flag is "NG," thereby the wake signal is not transmitted immediately even when the touch is detected. In this case, the wake signal transmissibility flag becomes "OK" at time t3, thereby the wake signal is transmitted from the vehicle 90 (i.e., the electronic key system 10) at time t3, as shown in the fifth timing chart tc5. At such timing, since the sensor 22 has detected the touch, the wake signal is transmitted from the LF antenna 32 corresponding to the sensor 22. "Corresponding to the sensor 22" indicates "installed in the same door as the passenger side door where the sensor 22 is arranged."

As shown in the sixth timing chart tc6, the wake signal transmitted at time t3 starts to be received by the second portable device 302 (LF driver 330) at time t3. In the second portable device 302, the BLE driver 340 starts transmission of the advertise signal at time t4 after the above-described time Tres from time t3 at which reception of the wake signal has started. As shown in the second timing chart tc2, time t4 corresponds to a time after the sum of the offset time Toff and the time Tres, that is, the time after lapse of one transmission cycle Tci from time t1 serving as a starting point. Therefore, at such timing, the first transmission/reception TR3 has just been complete, and the BLE tuner 200 is not performing BLE wireless communication. Therefore, the advertise signal transmitted from the second portable device 302 at time t4 is received by the electronic key system 10 (i.e., by the BLE tuner 200) without interference of other radio signals, preventing retries of transmission of the radio signal due to the interference.

Note that the period during which the wake signal transmissibility flag shown in the fourth timing chart tc4 is "OK" (hereinafter referred to as "wake signal transmittable period Tlfok") is calculated as follows. That is, the wake signal transmittable period Tlfok is calculable as a time by subtracting (A) from (B), among which (A) is a required time for (a) transmission of the BLE signal and (b) reception of a response signal responding thereto, that is, more practically, (a') transmission of the advertise signal and (b) reception of the connect signal responding thereto (hereinafter also referred to as "time Tadv"), and (B) is the above-described time Tscan (i.e., a period from reception of the BLE signal in the first transmission/reception to transmission of the BLE signal in the next first transmission/reception). For example, in the example of FIG. 6, the time Tadv required for transmission of the advertise signal from the second portable device 302 starting at time t4 and reception of the connect signal transmitted from the vehicle 90 (i.e., from the BLE tuner 200 of the electronic key system 10) (in other words, the time required for the first transmission/reception TR4) is subtracted from the time Tscan to obtain the wake signal transmittable period Tlfok. Therefore, the integrity controller 111 sets the wake signal transmissibility flag to "NG" at the timing when the wake signal transmittable period Tlfok has passed after the wake signal transmissibility flag becomes "OK." By such setting, an overlap of (a) the timing of the first transmission/reception for the second time after the occurrence of an event and (b) the timing of the transmission of the advertise signal from the second portable device 302, due to a large delay in the transmission of the wake signal from the occurrence of the event, is avoidable.

A comparative example is now described. Device configurations of the vehicle, the first portable device, and the second portable device in the comparative example are the same as those of the vehicle 90, the first portable device 301, and the second portable device 302 in the first embodiment. Timing charts tc11, tc12, tc13, tc15, tc16, tc17 and tc18 of the comparative example shown in FIG. 7 (indicating the same signal or state) respectively correspond to the above-described timing charts tc1, tc2, tc3, tc5, tc6, tc7 and tc8. Note that the timing chart of the comparative example does not have a timing chart corresponding to the fourth timing chart tc4 in the first embodiment. This is because, in the comparative example, the wake signal transmissibility flag is not set and the wake signal can always be transmitted.

Figure 7:
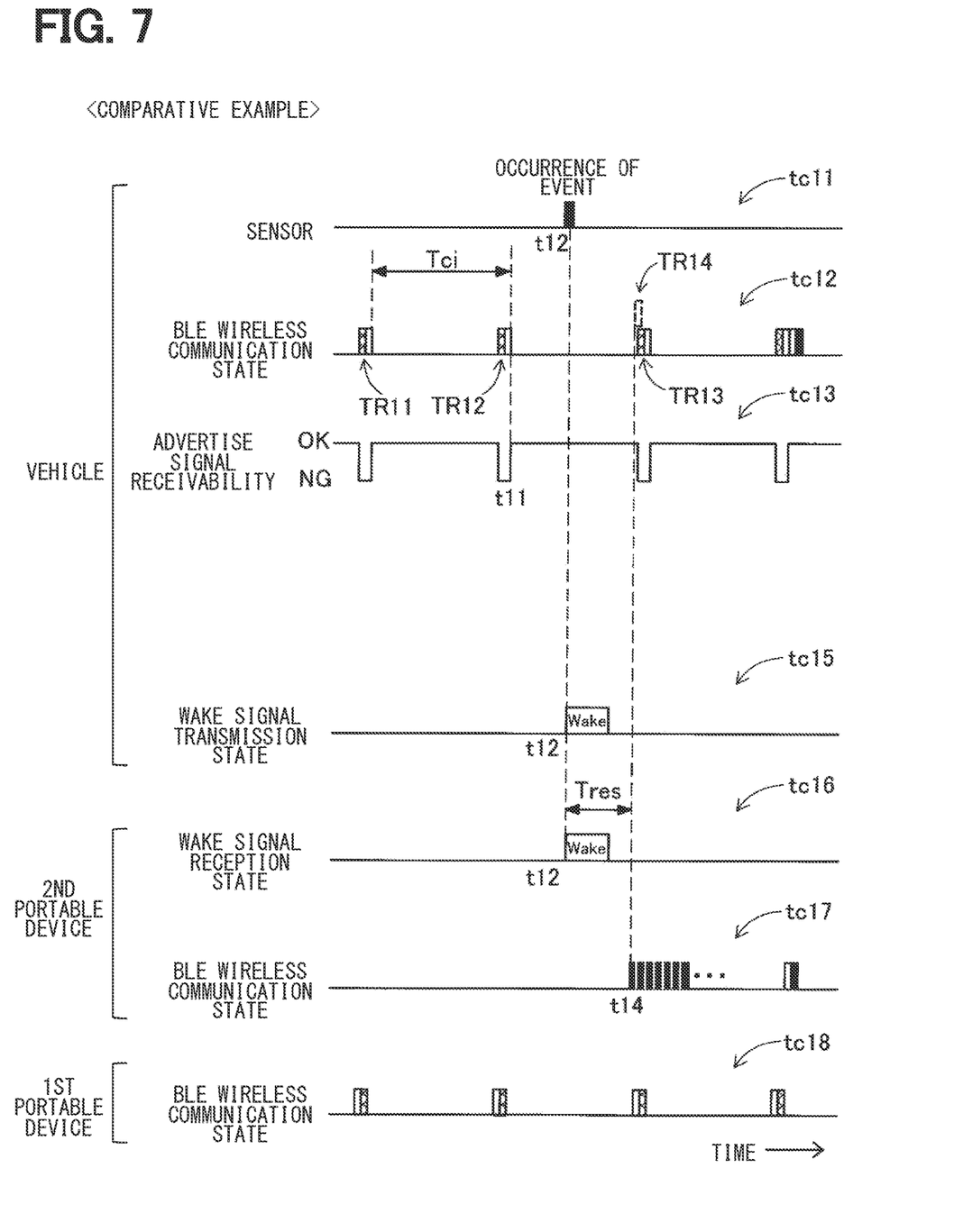
FIG. 7 is a timing chart showing an example of changes over time in signals and states related to wireless communication in a vehicle, a first portable device, and a second portable device in a comparative example.

In the comparative example, as in the first embodiment, periodic verification is performed with the first portable device, and BLE signals are exchanged in the same transmission cycle as the above-described transmission cycle Tci, that is, the first transmission/receptions TR11, TR12, TR13, ... are being performed. When the sensor 22 detects a touch at time t12, the vehicle transmits a wake signal at the same time t12 as shown in the fifth timing chart tc15. Such a wake signal is received by the second portable device, and the second portable device transmits an advertise signal at time t14 after time Tres from time t12. As shown in FIG. 7, the second transmission/reception TR14 related to transmission/reception of the advertise signal overlaps with the first transmission/reception TR13 in terms of time. Therefore, the advertise signal interferes with the radio signal in the first transmission/reception TR13 and is not normally received by the vehicle. Therefore, since the vehicle does not transmit the connect signal as a response signal to the advertise signal, the second portable device repeats the transmission of the advertise signal as shown in the seventh timing chart tc17. Therefore, it takes a long time to authenticate (verify) the second portable device 302.

On the other hand, in the electronic key system 10 in the first embodiment, as described above, the advertise signal transmitted from the second portable device 302 at time t4, which is a time when the first transmission/reception TR3 is complete and the first transmission/reception is not being performed any more, is received by the vehicle 90 without interfering with other radio signals. Therefore, authentication (verification) of the second portable device 302 is complete in a short time.

According to the electronic key system 10 in the first embodiment described above, in case of performing a transmission attempt to transmit the verification signal for confirming presence or absence of the second portable device 302 when the first transmission/reception is being performed, the integrity controller 111 adjusts a transmission timing of the wake signal, which is the verification signal for confirming the presence or absence of the second portable device 302 in order to avoid an overlap of (a) a timing of the second transmission/reception and (b) a timing of the first transmission/reception being already performed, an interference between (a) the BLE signal exchanged with the first portable device 301 and (b) the BLE wireless communication with the second portable device 302 is suppressible. Therefore, in a configuration in which wireless communication for verification is performed between the two portable devices 301 and 302 and the vehicle 90 (i.e., the electronic key system 10), it is possible to suppress an increase of time required for verification.

More specifically, by suppressing an interference of the radio signals between (a) the first transmission/reception performed with the first portable device 301 by using the reception of the wake signal for the periodic verification as a trigger, and (b) the second transmission/reception performed with the second portable device 302 by using the reception of the wake signal for the event verification as a trigger, it is possible to suppress an increase of time required for both verifications.

Further, when the occurrence of an event (a touch on the door handle) is detected, the timing after the offset time Toff or more from the end timing of the radio signal transmission/reception in the first transmission/reception performed most recently before the occurrence of the event is set as the transmission timing of the wake signal for the event verification, thereby, when the wake signal is transmitted at such setting of the transmission timing, an interference between (a) the reception of the advertise signal transmitted as the second transmission which is triggered by such wake signal, and (b) the scheduled transmission/reception of the radio signal in the second transmission/reception scheduled to be performed next to the most recently performed first transmission/reception in the first transmission/reception by the first portable device 301 is suppressible.

Further, when the occurrence of an event is detected, the transmission timing of the wake signal is set to a timing in the wake signal transmittable period Tlfok, which starts at a timing after lapse of the offset time Toff from the end timing of the transmission/reception of the radio signal in the first transmission/reception most recently performed before the occurrence of the event, thereby, when the wake signal is transmitted at the transmission timing, an overlap between (a) the reception of the advertise signal by the vehicle 90 which is transmitted in the second transmission/reception triggered by such wake signal and (b) the transmission/reception of the radio signal in the first transmission/reception scheduled to be performed as the second occasion of the first transmission/reception from the most recently performed first transmission/reception by the first portable device 301 (in other words, the second occasion of the first transmission/reception after the occurrence of the event) is suppressible.

Also, when the advertise signal is transmitted in the second transmission/reception triggered by the reception of the wake signal, an incomplete reception of the advertise signal due to an overlap with the timing of the transmission/reception of the BLE signal in the first transmission/reception that has already been performed is suppressible. Therefore, it is possible to prevent an increase of time to completion of the connection between the second portable device 302 and the electronic key system 10 due to the failure to receive the advertise signal.

B. Second Embodiment

The system configuration of the electronic key system 10 in the second embodiment is the same as that of the electronic key system 10 in the first embodiment. Therefore, redundant description of the same configuration elements having the same signs are omitted. In the electronic key system 10 in the first embodiment, when one of the two portable devices 301 and 302 is undergoing the periodic verification and the event verification is performed for the other portable device during such periodic verification, the transmission timing of the wake signal in the other portable device is adjusted. On the other hand, in the electronic key system 10 in the second embodiment, a periodic verification process described later is performed. As a result, when both of the two portable devices 301 and 302 perform the periodic verification, the transmission timing of the wake signal is adjusted in one of the periodic verifications.

Figure 8:
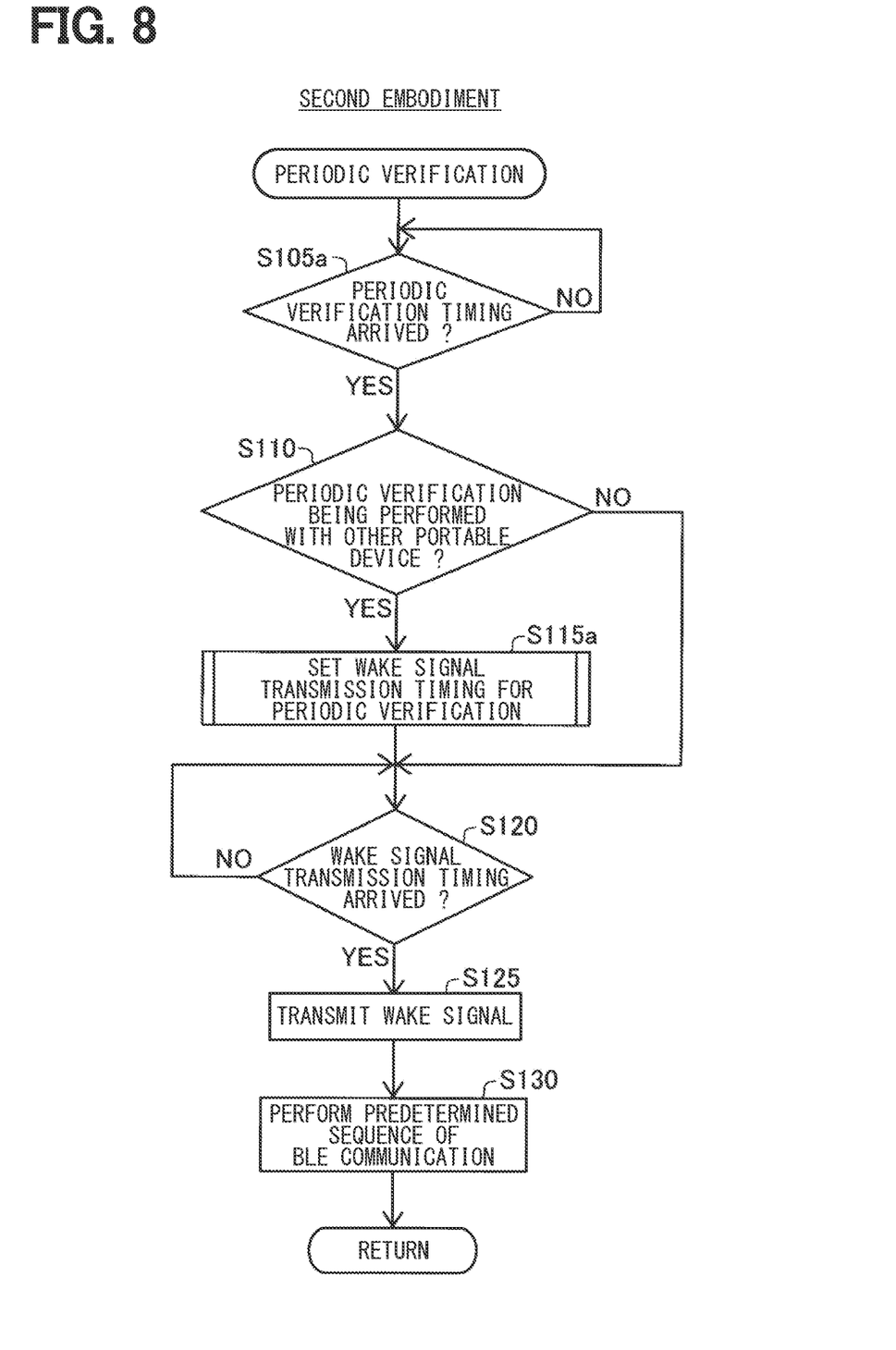
FIG. 8 is a flowchart showing a procedure of periodic verification processing in a second embodiment.

When the verification ECU 100 is powered on, the periodic verification process shown in FIG. 8 is performed. The periodic verification process differs from the event verification process in the first embodiment shown in FIG. 4 in that step S105a is performed instead of step S105 and step S115a is performed instead of step S115. Other procedures of the periodic verification process shown in FIG. 8 are the same as those of the event verification process in the first embodiment shown in FIG. 4. Therefore, the same procedure bears the same sign, regarding which detailed explanation is omitted.

The integrity controller 111 determines whether or not a timing for the periodic verification has arrived (step S105a).

In the present embodiment, the "timing of periodic verification" determined in step S105a is regarding a periodic verification started later by one of the first portable device 301 and the second portable device 302 than the other (the subject portable device is hereinafter referred to as a "later portable device"). As shown in FIG. 1, in a situation where the first portable device 301 possessed by the user m1 sitting in the driver's seat has already undergone the periodic verification, when the periodic verification is started for the second portable device 302 possessed by the user m2 sitting in the passenger seat, the second portable device 302 that has started the periodic verification later corresponds to the later portable device, and the periodic verification performed for the second portable device 302 corresponds the periodic verification in step S105a.

When it is determined that the periodic verification timing has not arrived (step S105a: NO), step S105a is performed again. On the other hand, when it is determined that the periodic verification timing has arrived (step S105a: YES), the above-described step S110 is performed to determine whether or not the periodic verification is being performed with other portable device(s) is determined. The "other portable device" in step S110 of the second embodiment indicates the first portable device 301, which is a portable device that has started the periodic verification earlier.

When it is determined that the periodic verification is not being performed (step S110: NO), steps S120 to S130 are performed as in the event verification process of the first embodiment. On the other hand, when it is determined that the periodic verification is being performed (step S110: YES), the integrity controller 111 sets the transmission timing of the wake signal for the periodic verification (step S115a). Note that the wake signal for the periodic verification for which the transmission timing is set in step S115a indicates a wake signal of the periodic verification of the later portable device.

Figure 9:
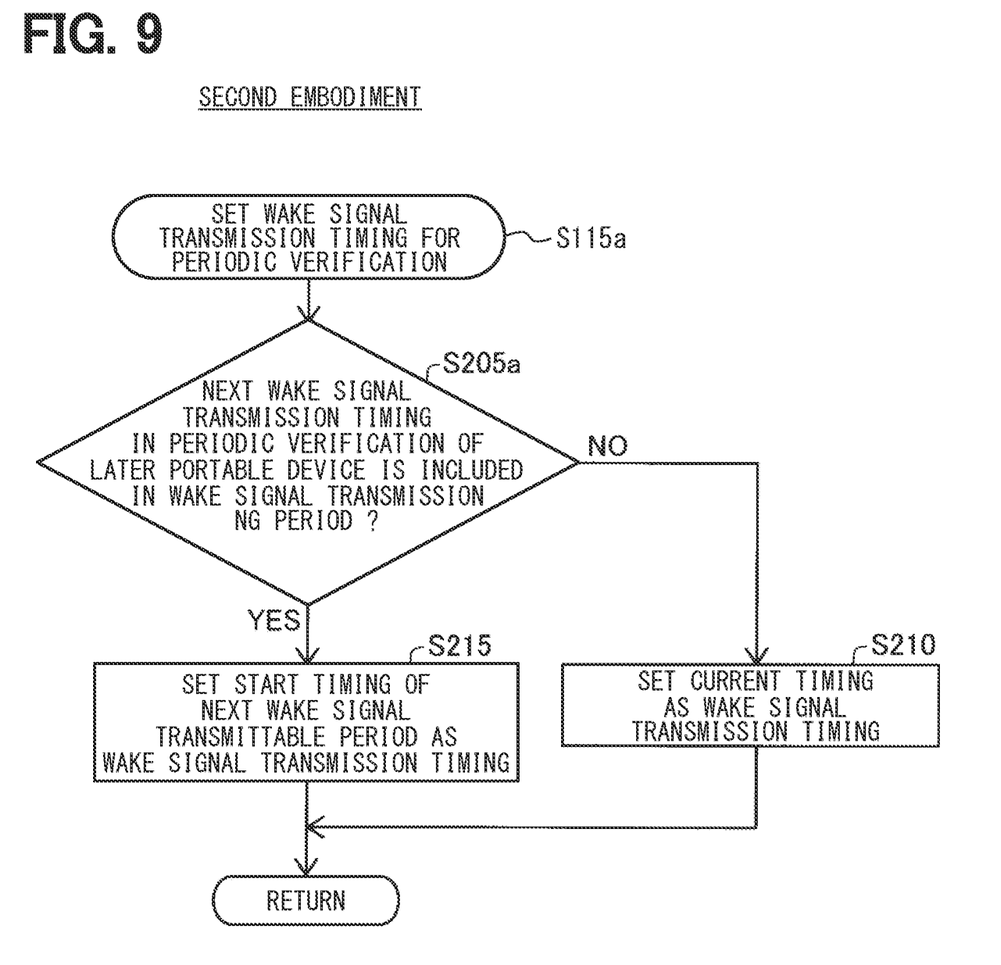
FIG. 9 is a flowchart showing a detailed procedure of an event timing determination step.

The detailed procedure of step S115a shown in FIG. 9 differs from the detailed procedure of step S115 shown in FIG. 5 in that step S205a is performed instead of step S205. Since other procedure in step S115a is the same as in step S115, the same procedure is denoted by the same sign, and detailed description thereof is omitted. First, the integrity controller 111 determines whether or not the next wake signal transmission timing in the periodic verification of the later portable device is included in the wake signal transmission NG period (step S205a). When it is determined that the next wake signal transmission timing in the periodic verification of the later portable device is not included in the wake signal transmission NG period (step S205a: NO), the above-described step S210 is performed, and the current time is set as the wake signal transmission timing. On the other hand, when it is determined that the next wake signal transmission timing in the periodic verification of the later portable device is included in the wake signal transmission NG period (step S205a: YES), the above-described step S215 is performed, and the start timing of the next wake signal transmittable period is set as the wake signal transmission timing.

The specific processing contents of step S215 in the second embodiment are the same as the processing of step S215 in the first embodiment. That is, the only difference is that the arrival of the next periodic verification timing for the second portable device 302 is replaced with the occurrence of the event (touch detection) in the first embodiment. Therefore, when the next periodic verification timing for the second portable device 302 arrives, the transmission of the wake signal targeting the second portable device 302 is delayed until the wake signal transmittable period Tlfok between (a) a starting timing set as a timing of the transmission/reception of the BLE signal associated with the most recent periodic verification of the first portable device 301 before the next periodic verification timing, that is, (a') a timing after lapse of the offset time Toff from the end timing of the first transmission/reception, and (b) an ending timing at a timing after lapse of "Tscan-Tadv time" from the above-described starting timing. The "wake signal targeting the second portable device 302" indicates a wake signal transmitted only from the LF antenna (for example, the LF antenna 32) located near the front passenger seat. Through such processing, in the transmission/reception of the BLE signal (that is, the first transmission/reception and the second transmission/reception) triggered by the transmission/reception of the wake signal for the periodic verification performed by the two, i.e., first portable device 301 and second portable device 302, an interference between the radio signals is suppressible.

The electronic key system 10 in the second embodiment described above has the same effects as the electronic key system 10 in the first embodiment. In addition, an interference of the radio signals is suppressible between (a) the first transmission/reception that is triggered by the reception of the wake signal for the periodic verification of the first portable device 301 and (b) the first transmission/reception that is triggered by the reception of the wake signal for the periodic verification by the second portable device 302, thereby suppressing an increase of time required for both verifications.

Further, when the transmission timing of the wake signal in the periodic verification of the second portable device 302 arrives, a timing after the offset time Toff from the end timing of the transmission/reception of the radio signal in the first transmission/reception most recently performed by the first portable device 301 before the above-described transmission timing arrives is set as the next transmission timing of the wake signal in the periodic verification of the second portable device 302, thereby, when the wake signal is transmitted at the set transmission timing, a reception of the radio signal transmitted in the second transmission/reception which is triggered by the wake signal and receive by the vehicle 90 is prevented from overlapping with the transmission/reception of the radio signal in the first transmission/reception scheduled to be performed next to the first transmission/reception most recently performed by the first portable device 301.

Further, when the transmission timing of the wake signal in the periodic verification of the second portable device 302 arrives, the transmission timing of the wake signal is set to a timing included in the wake signal transmittable period Tlfok, which starts at a timing after lapse of the offset time Toff from the end timing of the transmission/reception of the radio signal in the first transmission/reception most recently performed by the first portable device 301 before the arriving transmission timing, thereby, when the wake signal is transmitted at the transmission timing, an overlap between (a) the reception of the radio signal in the second transmission/reception by the first portable device, which is triggered by such wake signal and (b) the transmission/reception of the radio signal in the first transmission/reception scheduled to be performed as the second occasion of the first transmission/reception from/after ??? the most recently performed first transmission/reception by the first portable device 301 is suppressible.

C. Other Embodiments (C1) In each of the above embodiments, the number of electronic keys for the vehicle 90 assumed in the electronic key system 10 is two, i.e., one for the first portable device 301 and one for the second portable device 302. However, the number of keys may be arbitrary. Even in such a configuration, as for the first embodiment, for example, when, in a situation that two portable devices are already performing the periodic verification, the event verification occurs for the third portable device, the interference of the BLE signal is suppressible by adjusting the transmission timing of the wake signal for the third portable device. Similarly, as for the second embodiment, when three portable devices respectively perform the periodic verification, by adjusting the wake signal transmission timings for the portable devices that have started the periodic verification secondly and third(ly), the interference of the BLE signal is suppressible.

(C2) In each of the above embodiments, the wake signal is transmitted simultaneously with the start of the wake signal transmittable period Tlfok. Specifically, as shown in the fifth timing chart tc5 of FIG. 6, the wake signal is transmitted from the vehicle 90 at time t3 i.e., when the wake signal transmittable period Tlfok starts. However, the present disclosure is not so limited. The wake signal may be transmitted at any arbitrary timing during the wake signal transmittable period Tlfok. For example, in the first embodiment, the wake signal may be transmitted after time t3. Even in such a configuration, the same effect as each embodiment can be obtained.

(C3) In each of the above embodiments, transmission of the wake signal from the vehicle 90 (i.e., the electronic key system 10) to each of the portable devices 301 and 302 is realized by LF wireless communication, and subsequent exchange of authentication information is realized by BLE wireless communication. However, the present disclosure is not limited thereto. For example, other wireless communication, such as BLE wireless communication or Bluetooth (registered trademark), may also be used to transmit the verification signal to each of the portable devices 301 and 302. Similarly, authentication information may be exchanged by wireless communication using a UHF (Ultra High Frequency) band such as 300 MHz to 3 GHz, or other wireless communication such as Bluetooth (registered trademark).

(C4) In each of the above embodiments, both of the first portable device 301 and the second portable device 302 are also called "key fobs" and are dedicated devices as electronic keys for the vehicle 90. However, the present disclosure is not limited thereto. For example, an arbitrary type of device such as a smartphone or a personal computer that can realize the functions required for the portable device 300 may be used as an electronic key for the vehicle 90 instead of or in addition to the portable device 300.

(C5) The verification ECU 100 and methods described in the present disclosure may be realized by dedicated computers provided by configuring a processor and memory programmed to perform one or more functions embodied by a computer program. Alternatively, the verification ECU 100 and methods described in the present disclosure may also be realized by a dedicated computer provided by configuring the processor with one or more dedicated hardware logic circuits. Alternatively, the verification ECU 100 and methods described in the present disclosure may also be realized by one or more dedicated computers configured as a combination of (a) a processor and memory programmed to perform one or more functions and (b) a processor configured by one or more hardware logic circuits. Further, the computer program may be stored in a computer-readable, non-transitory, tangible storage medium as instructions to be executed by a computer.

The present disclosure is not limited to the above embodiments, and is realized by various configurations without departing from the gist of the present disclosure. For example, the technical features in each of the embodiments corresponding to the technical features in the form described in the summary may appropriately be replaced, switched, and/or combined, in order (a) to solve some or all of the above-described problems, or (b) to provide some or all of the above-described effects. Also, when the technical features are not described as essential in the present specification, they can be deleted as appropriate.

What is claimed is:

1. An electronic key system installed in a vehicle, comprising:
    a first wireless communication controller performing transmission of a predetermined radio signal, as a verification signal, via a first wireless communication to confirm presence or absence of each of a first portable device and a second portable device each of which is usable as an electronic key of the vehicle;
    a second wireless communication controller periodically performing transmission/reception of a radio signal via second wireless communication to and from each of the first portable device and the second portable device upon transmitting/receiving the verification signal; and
    an integrity controller integrally controlling an operation of each of the first wireless communication controller and the second wireless communication controller, wherein
    when the first wireless communication controller attempts to transmit the verification signal to confirm presence or absence of the second portable device while the second wireless communication controller is periodically performing, as a first transmission/reception, transmission/reception of the radio signal with the first portable device via the second wireless communication in response to the first portable device receiving the verification signal,
    the integrity controller adjusts a transmission timing of the verification signal for confirming presence or absence of the second portable device to avoid overlapping between (i) a timing of a second transmission/reception that is periodic transmission/reception of the radio signal performed by the second wireless communication controller with the second portable device via the second wireless communication in response to the second portable device receiving the verification signal and (ii) a timing of the first transmission/reception that is being performed.

2. The electronic key system according to claim 1, wherein
    the second wireless communication controller performs the first transmission/reception with the first portable device in response to the first portable device receiving the verification signal while the first wireless communication controller is performing a periodic verification by periodically transmitting the verification signal to confirm presence or absence of the first portable device,
    the second wireless communication controller performs the second transmission/reception with the second portable device in response to the second portable device receiving the verification signal while the first wireless communication controller is performing an event verification with the second portable device by transmitting the verification signal, and the event verification is asynchronously performed with the periodic verification in response to an occurrence of a predetermined event.

3. The electronic key system according to claim 2, wherein an offset time is calculated by subtracting (i) a time from reception of the verification signal by the second portable device to a start of transmission of the radio signal via the second wireless communication from (ii) a transmission/reception cycle of the radio signal in the second transmission/reception, and upon detecting an occurrence of the predetermined event, the integrity controller sets, as a transmission timing of the verification signal for the event verification, a timing after lapse of the offset time from an end timing of the transmission/reception of the radio signal in the first transmission/reception that was most recently performed before the occurrence of the predetermined event.

4. The electronic key system according to claim 3, wherein a transmittable period is calculated by subtracting (a) an advertise time required for transmission of the radio signal and for reception of a response radio signal in response to the transmitted radio signal in the second wireless communication from (b) a time (i) from completion of a current transmission/reception of the radio signal in the first transmission/reception (ii) to a start of a next transmission/reception of the radio signal in the first transmission/reception, and upon detecting an occurrence of the predetermined event, the integrity controller sets, as the transmission timing of the verification signal for the event verification, a timing included in the transmittable period from a starting point in time after lapse of the offset time from the end timing of the transmission/reception of the radio signal in the first transmission/reception that was most recently performed before the occurrence of the predetermined period.

5. The electronic key system according to claim 1, wherein the second wireless communication controller performs the first transmission/reception with the second portable device in response to the first portable device receiving the verification signal while the first wireless communication controller is performing a periodic verification by periodically transmitting the verification signal to confirm presence or absence of the first portable device, and the second wireless communication controller performs the second transmission/reception with the second portable device in response to the second portable device receiving the verification signal while the first wireless communication controller is performing the periodic verification to periodically confirm the presence or absence of the second portable device.

6. The electronic key system according to claim 5, wherein an offset time is calculated by subtracting (i) a time from reception of the verification signal by the second portable device to a start of transmission of the radio signal via the second wireless communication from (ii) a transmission/reception cycle of the radio signal in the second transmission/reception, and when the transmission timing of the verification signal for the periodic verification of the second portable device arrives while the periodic verification for the first portable device is being performed, the integrity controller sets, as a next transmission timing of the verification signal for the periodic verification of the second portable device, a timing after lapse of the offset time from an end timing of the transmission/reception of the radio signal in the first transmission/reception that was most recently performed before the arriving transmission timing.

7. The electronic key system according to claim 6, wherein a transmittable period is calculated by subtracting (a) an advertise time required for transmission of the radio signal and for reception of a response radio signal in response to the transmitted radio signal via the second wireless communication from (b) a time (i) from completion of a current transmission/reception of the radio signal in the first transmission/reception (ii) to a start of a next transmission/reception of the radio signal in the first transmission/reception, and when the transmission timing of the verification signal for the periodic verification of the second portable device arrives while the periodic verification for the first portable device is being performed, the integrity controller sets, as a next transmission timing of the verification signal for the periodic verification of the second portable device, a timing included in the transmittable period from a starting point in time after lapse of the offset time from the end timing of the transmission/reception of the radio signal in the first transmission/reception that was most recently performed before the arriving transmission timing.

8. The electronic key system according to claim 1, wherein the first wireless communication is a wireless communication that transmits and receives the predetermined radio signal over an LF (Low Frequency) band, the second wireless communication is a BLE (Bluetooth Low Energy) communication, the verification signal is a wake signal for changing an operation mode of each of the first portable device and the second portable device from a sleep operation mode to a normal operation mode, and the transmission/reception of the radio signal via the second wireless communication includes the transmission/reception of an advertise signal transmitted from the first portable device and the second portable device.

* * * * *